United States Patent [19]

Pasquier et al.

[11] Patent Number: 5,259,857
[45] Date of Patent: Nov. 9, 1993

[54] PROCESS FOR CONTROLLING THE TEMPERATURE OF A FIBER CENTRIFUGER

[75] Inventors: Michel Pasquier, Liancourt; Daniel Guyot; Jean Battigelli, both of Rantigny, all of France

[73] Assignee: Isover Saint-Gobain, Courbevoie, France

[21] Appl. No.: 770,932

[22] Filed: Oct. 4, 1991

[30] Foreign Application Priority Data

Oct. 4, 1990 [FR] France .................. 90 12228

[51] Int. Cl.$^5$ .................. B28B 1/54; C29B 9/00; C03B 37/04
[52] U.S. Cl. .................. 65/6; 65/14; 65/29; 65/162; 264/8; 264/40.1; 264/40.2; 264/40.6; 425/8; 425/135; 425/136; 425/143; 425/144
[58] Field of Search .............. 264/5, 8, 40.1, 40.2, 264/40.6; 425/8, 6, 143, 144, 135, 136; 65/6, 8, 14, 15, 29, 161, 162

[56] References Cited

U.S. PATENT DOCUMENTS

| | | |
|---|---|---|
| 4,392,879 | 7/1983 | Takeuchi . |
| 4,718,930 | 1/1988 | Gartner et al. ............... 65/6 |
| 4,861,362 | 8/1989 | Denniston ............... 65/6 |
| 4,889,546 | 12/1989 | Denniston ............... 65/6 |

FOREIGN PATENT DOCUMENTS

| | | |
|---|---|---|
| 0219433 | 4/1987 | European Pat. Off. . |
| 536137 | 12/1986 | Fed. Rep. of Germany ...... 65/6 |
| 2443436 | 4/1980 | France . |

*Primary Examiner*—Karen Aftergut
*Attorney, Agent, or Firm*—Oblon, Spivak, McClelland, Maier & Neustadt

[57] ABSTRACT

A process and apparatus for controlling the manufacture of mineral fibers, in particular glass fibers, by use of a fiber-drawing process using internal centrifuging in a centrifuger. The peripheral strip is pierced by a large number of outlet orifices and the radiation emitted superficially by the peripheral strip is measured in order to determine the temperature of points of the peripheral strip and the vertical coordinate of each of the points measured.

8 Claims, 1 Drawing Sheet

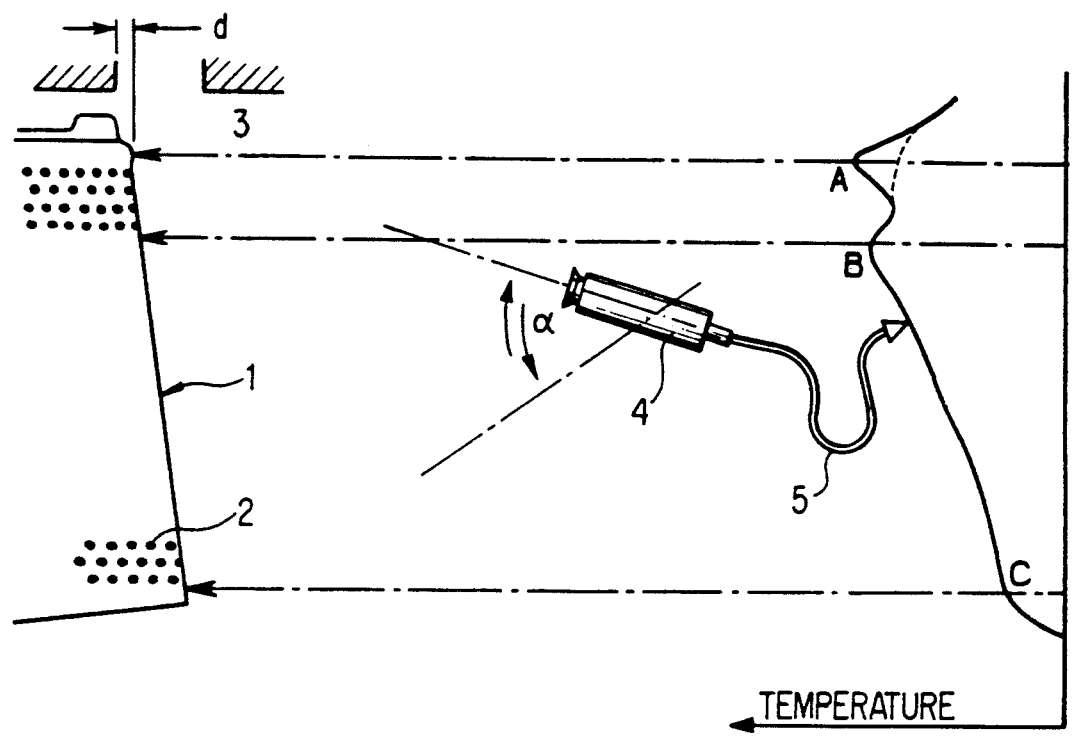
FIG_1
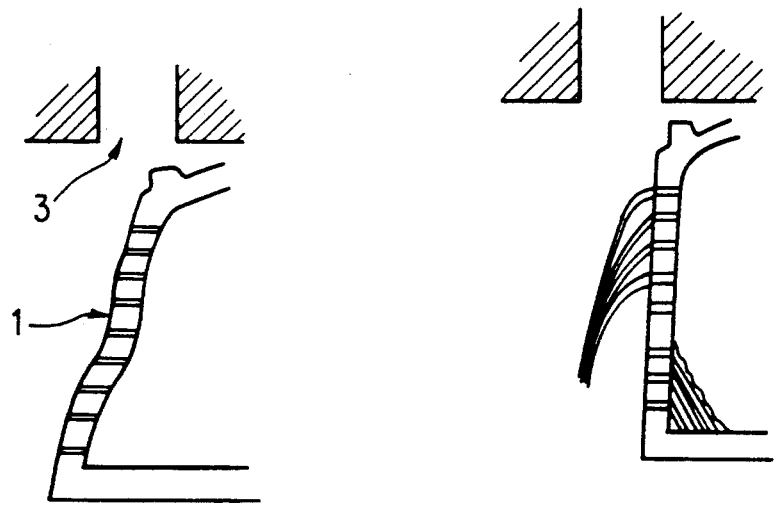
FIG_2  FIG_3

PROCESS FOR CONTROLLING THE TEMPERATURE OF A FIBER CENTRIFUGER

BACKGROUND OF THE INVENTION

1. Field of the Invention

The invention relates to a process for controlling the temperature of a fiber spinner used during the manufacture of so-called insulating glass fibers. The invention also relates to an apparatus suitable for performing this process. It is applied in particular to the automation of lines producing glass wool used principally in the composition of heat and/or sound insulating products.

2. Description of the Related Art

So-called insulating glass fibers are currently produced by internal centrifuging, i.e., by introducing a thin stream of molten glass into a centrifuger, which is also known as a fiber spinner rotating at high speed and having on its periphery a very large number of orifices. Under the effect of centrifugal force, the glass is projected through these orifices in the form of filaments. In addition to the centrifugal force there may also be a process of drawing by a high temperature and velocity gaseous current, emitted tangentially to the perforated wall of the centrifuger. In these techniques the centrifuger—of which the diameter may optionally exceed one meter—is very highly stressed by forces of a mechanical (high rotational velocity), thermal (glass at approximately 1000° C.) and chemical (corrosion by the glass) origin. The quality of the fibers produced depends very strictly on the correct operation of the centrifuger, i.e., on its good general condition and adherence to the reference values with respect to velocity and temperature.

There is hardly any reason for the velocity to be modified by disturbances during manufacture and it may be mastered completely independent of all the other parameters if the shaft is driven by an asynchronous motor controlled in a suitable manner. The reference value given for the rotational velocity may thus be considered as being strictly adhered to.

In contrast, the temperature of the centrifuger is sensitive to a large number of factors including, for example, the action of internal burners heating the interior of the centrifuger and any additional heating means, a magnetic induction heater directed more particularly at the base of the centrifuger, the temperature of the glass, the flow rate of the glass, the temperature of the gaseous drawing current emitted in the immediate vicinity of the centrifuger, the relatively hot atmosphere prevailing around the centrifuger, the relatively intense cooling owing to the relatively high rotational velocity, and the centrifuger itself which may become deformed after a given amount of operating time and may consequently react differently to the effect of heating by the burners.

As indicated above, unsatisfactory temperatures cause large-scale disturbance of the fiber-drawing process. Thus if the centrifuger is too cold, devitrification may begin which renders the glass unsuitable for fiber-drawing; a centrifuger which is too hot and is at the thermal fracture limit and may moreover lead to the formation of non-fibered portions or extremely fine fibers which are undesired, owing to the glass being too highly fluid.

In order to control the temperature of the centrifuger it is proposed in U.S. Pat. No. 4,392,879 to place thermocouples on the internal wall of the centrifuger and to transform the electric signal received into an electromagnetic wave analyzed by a fixed receiver which is not rotationally integral with the centrifuger. The electrical signal received then serves as a parameter for regulating the annular burner for the gaseous drawing process located just on the periphery of this centrifuger. In this technique, the number of points analyzed on the surface of the centrifuger is of necessity restricted relative to the height of the strip and in particular relative to the total length of the circumference of the centrifuger. In addition the internal temperature is not always highly instructive since its value may in fact be more characteristic of the temperature of the molten glass accumulated in the form of a reserve than of the actual temperature of the centrifuger. In addition, a thermocouple may become detached from the internal wall and then indicate the temperature of a point other than that which it is supposed to analyze. The temperature of a centrifuger is not constant over the entire height of the strip, if only because the glass does not always melt completely uniformly; these irregularities in temperature are thus considered to be normal provided they remain within defined limits. Delocalized measurements, i.e., incorrect measurements which are interpreted as correct, may lead to random control of the annular burner.

There is further disclosed in EP-B1-219,433 a process for manufacturing glass fibers in which the maximum temperature of the centrifuger is determined by continuously measuring the radiation emitted by the strip during a reciprocating movement over the entire height of the strip. The maximum temperature is subsequently used as a value for regulating the burner. The equipment is less fragile than in the previous case. Furthermore, the temperature is effectively measured at the hottest point and not at the point which is assumed to be the hottest. It is thus possible to avoid overheating wherever it occurs and not only at the point where it is expected. Moreover, it is the external temperature which is measured and not the internal temperature of the centrifuger strip, the external temperature being more representative of the temperature of the fiber-drawing process by centrifuging.

It appears that the apparatus disclosed in EP-B1-219,433 is most advantageous during the phase when the fiber-drawing process starts, i.e., the temperature of the centrifuger must be gradually increased without creating thermal shock. The apparatus enables the process to be systematically below critical temperatures and the theoretical heating profile of the part is properly respected.

During the fiber-drawing phase it has been noted that it is not always desirable to modify the properties of the drawing gas since the quality of the fibers produced is then modified, the relation between the temperature of the centrifuger and the temperature of the drawing gases not being purely straightforward but being influenced by other parameters such as the deformation of the centrifuger which heats up as it approaches the burner, for example. In addition, it has been noted above that the temperature of the centrifuger is not normally constant over the entire height of the strip. Although differences of low amplitude are considered normal, differences which are too great will damage the centrifuger and the quality of the fibers produced insofar as they result in abnormal operation of the apparatus.

In addition, the apparatus disclosed in U.S. Pat. Nos. 392,879 and EP-B1-219,433 are both practically ineffective as regards the noting of defects such as the beginning of cracking of the centrifuger or even deformation owing to a lower part of the centrifuger being warped towards the exterior. These defects may cause the centrifuger to rupture in the fiber-drawing hood with a considerable risk of igniting or large scale damage, or even danger of injury for any workers in the vicinity.

SUMMARY OF THE INVENTION

It is an object of the invention to provide a process and apparatus for controlling a fiber-drawing centrifuger suitable for providing information which can be compared with various anomalies in the fiber-drawing process in order that manual or automated intervention may be rapidly performed.

In accordance with the invention this object is achieved in that during the manufacture of mineral fibers, in particular of glass fibers, using a process employing internal centrifuging by means of a centrifuger of which the peripheral strip is perforated with a large number of outlet orifices, the radiation emitted superficially by the peripheral strip is measured in order to determine the temperature of points on the peripheral strip and this temperature is correlated with the vertical coordinate of each of these corresponding points.

With respect to the state of the art disclosed in EP-B1-219,433 there is therefore an additional step of correlating the temperatures measured and their location.

The first notable point of the profile so measured corresponds to the hottest point of the perforated part of the peripheral strip, which point will subsequently be known in brief as the hottest point although in numerous cases the point of the centrifuger which is actually the hottest is located outside this perforated zone where the filaments are formed. Under normal fiber-drawing conditions, at constant velocity and temperature, the hottest point is fixed and determined by the glass flow conditions. Tests have shown that the hottest point is associated with the maximum flow rate. When the viscosity of the molten glass decreases (or, in other words, if the temperature of the glass increases or if the composition of the glass has been modified), the hottest point will be displaced, in this case it will drop downwardly. Moreover, and this is a particularly advantageous aspect of the invention, if the glass is presented with new possibilities for escape, for example if cracking starts, the hot point will again be offset and will be centered at this crack. Knowing that a crack does not spread instantly, the operator has plenty of time to interrupt the flow of glass and stop the centrifuger according to the normal stopping procedure and not according to an emergency procedure which is always more risky.

As a general rule, it was indicated above that the present inventors prefer not to attempt to correct the temperature of the hottest point during the fiber-drawing period by modifying the temperature and/or the flow rate of the hot gases emitted by the annular drawing burner, as this action involves the risk of modifying the properties of the fibers owing to a variation in the drawing conditions. In contrast, outside the fiber-drawing period—in particular during a stoppage or when a production process is started—or if the gases emitted are simply intended to maintain a hot atmosphere around the centrifuger - it is particularly advantageous to use the maximum temperature measured as the value for regulating the annular burner.

This first control is advantageously completed by a measurement of the temperature of the base of the peripheral strip. In effect, if the centrifuger warps, the base of the centrifuger penetrates the zone of the hot gases emitted by the annular burner, is then heated to a greater extent by these gases and its temperature is thus increased. This increase in temperature is thus characteristic of a high degree of fatigue of the centrifuger for which a replacement must always be ready. If, on the other hand, the temperature of the base of the strip decreases substantially, this signifies, for example, the beginning of devitrification of the glass which has accumulated at the bottom of the centrifuger and has been cooled to a great extent by the cold air present under the centrifuger, and agitated intensely owing to the rotation. It is then necessary to increase the amount of heat supplied specifically to the base of the centrifuger, for example by a magnetic induction heating device as is disclosed in French patent FR-A-2,443,436 for example.

Preferably the profile indicates the temperature of the top of the peripheral strip, which is the hottest point above the perforated section, of which a rapid increase is characteristic of an anomaly, for example a centrifuger which is on the point of cracking or an off-centered annular burner emitting gases directed toward the centrifuger and not solely to the periphery, while a more gradual variation possibly correlated with an increase in the temperature of the bottom of the strip—is an indication of abnormal wear of the centrifuger.

In a preferred variant, the invention proposes monitoring three points on the peripheral strip, of which the coordinates are strictly determined but not defined, a priori. Advantageously these three points are deduced by analysis of the curve of the temperature profile, the three points measured corresponding to three extremes of this profile. Preferably, however, the calculator takes as a basis the coordinates of the vertically lowest point to determine the coordinates of the vertically highest point, which is sometimes quite difficult to distinguish on the temperature profile but is remote from the lowest point by a distance corresponding exactly to the height of the peripheral strip.

Advantageously the operator is warned by a series of warning devices of any temperature which is different from the normal temperature thus corresponding to incorrect operating conditions. The actions required for returning to normal are triggered either by the operator or purely automatically, the latter case being preferred when it is necessary to stop the flow of molten glass for safety reasons in particular.

The process according to the invention may advantageously be implemented by means of an infra-red radiation pyrometer provided with a pivoting optical part with a rectangular sight target which is long and narrow in order to record the radiation from a relatively large surface without impairing the accuracy of measurement, a resolution of more than 20 points being preferred. Advantageously only the pyrometer optical part is mounted in the vicinity of the centrifuger, but at a distance which is greater than or equal to 1 meter and the signals are transmitted by an optical fiber to a computer placed at a distance and equipped with conventional input/output devices.

BRIEF DESCRIPTION OF THE DRAWINGS

Further advantageous features and details of the invention will emerge from the following description which is given with reference to the attached drawings wherein:

FIG. 1 is a diagram illustrating the control procedure according to the invention;

FIG. 2 is a diagram of the centrifuger of which the peripheral strip is deformed; and FIG. 3 is a diagram of the centrifuger in which a temperature at the bottom of the strip is too low.

DETAILED DESCRIPTION OF THE PREFERRED EMBODIMENTS

On the left-hand side of FIG. 1 there is illustrated the peripheral strip 1, pierced with several thousands of outlet apertures 2, of a centrifuger used for manufacturing glass fibers for example. If the fiber-drawing process is not purely centrifugal, the centrifuger is surrounded by the lip of an annular burner 3 which generates a gaseous current for maintaining a high temperature around the centrifuger. The distance d in the hot state which normally separates the top of the peripheral strip of the centrifuger from the lip of the annular burner is only a few millimeters; any off-centering thus greatly disturbs the heating conditions. The centrifuger rotates at high velocity and is continuously fed with a jet of molten glass preferably poured onto a distributor member comprising a hollow cylindrical body provided with relatively large orifices whose role is to divide the molten material and direct it under the effect of centrifugal force towards the inner surface of the peripheral strip which it coats and from which it is discharged via the multiple apertures 2 in the form of a series of radial filaments.

These radial filaments penetrate the gaseous current emitted by the external burner and optionally a second blowing collar, are drawn by this gaseous current, and are thus converted into fibers.

At a distance of the order of 1 meter, for example, there is located the optical part 4 of a pyrometer of which the maximum degree of sensitivity is preferably adjusted for the range of radiation close to infra-red, thus between 0.6 and microns. This optical part 4 is pivotably mounted for pivoting about a horizontal axis and so scans up and down by an angle $\alpha$ so as to view the entire height of the peripheral strip with a continuous reciprocating movement. The sight target of the scanner should have a relatively large surface area, preferably of the order of 10 to 15 $mm^2$ in order to obtain good sensitivity when measuring. In addition, the height of the target must be as small as possible in order to achieve high accuracy as regards the vertical coordinates of the points measured. A satisfactory compromise is obtained with a rectangular target 1 to 3 mm high and 20 mm wide.

All the electronics (not shown) associated with the optical part proper are preferably arranged at a great distance, the two parts being connected by an optical fiber 5 which is cooled if necessary.

The electronics include some means for displaying or recording a temperature profile graph in which temperature is plotted against vertical position.

Each time the peripheral strip 1 is scanned, a new temperature profile along the height of the strip is recorded. A typical profile is shown at the right side of FIG. 1. Each profile has three notable points A, B and C corresponding respectively to the highest point of the strip, the hottest point the position of the strip having the operatures 2 and the lowest point. It should be noted that point A does not always correspond to a peak of the curve (for example in a curve exemplified by the dashed line segment) but it may be found by means of its vertical coordinate by fixed definition and by means of the position of point C, the distance between A and C corresponding to the height of the peripheral strip. Preferably points B and C are plotted by analyzing the derived curve corresponding to the temperature profile.

Knowledge of this temperature profile, or more precisely of these points A, B and C, enables the fiber-drawing process to be continuously analyzed and automatically regulated as appropriate. Advantageously the profile is determined at least every minute and preferably 3 to 4 times per minute, which is of course impossible for the operators themselves to perform.

Outside the fiber-drawing period, i.e., when the centrifuger is not supplied with molten glass, the essential factor is to avoid local overheating by altering, if necessary, the temperature and/or flow rate of the gases emitted by the annular burner. Regulation is thus performed on the basis of the point B as indicated in patent EP-B1-219, 433.

During the fiber-drawing period, no attempts is made to regulate the annular burner, which has normally reached a point of equilibrium suitable for a regular fiber-drawing process. On the other hand, the three points A, B and C give characteristic indications of the fiber-drawing process.

Thus, if the temperatures measured are too high, and if the high temperature is at the upper point A, this signifies that the centrifuger has started to abnormally penetrate the lip of the annular burner (this instance is illustrated in FIG. 2—the deformations being exaggerated for better comprehension of the phenomena). The consequence is greater wear of the centrifuger. If after a given amount of time this overheating spreads to point B it is a sign of corrosion and accentuated deformation. If it finally reaches point C, the centrifuger must be replaced immediately. The operator thus has a permanent image of the actual state of the centrifuger which, as is known, depends not only on its age but also on the manufacturing conditions and its use, its useful life varying between only a few hours, for example if the part has casting defects, and several hundred hours. One possible means of correcting this anomaly is to reduce the rotational velocity of the centrifuger.

A gradual increase in temperature is also noted if the glass used is too hot and thus too fluid; it will then tend to pass at a greater flow rate through the apertures in the base of the peripheral strip, for example, and as a result the hottest point will be located half way up the peripheral strip for example and not in the vicinity of the first rows of outlet apertures. In this case, and after checking the composition of the glass, the heating of the glass may be decreased, i.e., by reducing the electrical power supply to the electrodes in the feed ducts located at the outlet of the melting oven or the temperature and/or flow rate of the internal burner, if present, modified. It may also be advantageous to alter the rotational velocity of the centrifuger, more precisely to increase it so as to elevate the hottest point.

There was illustrated above the case of a gradual increase of the temperatures but it sometimes also occurs that this increase is abrupt and generally associated with a rapid displacement of the hottest point. This phenomenon is due to an influx of molten glass in certain areas owing to the centrifuger beginning to crack. The operator may then intervene immediately and interrupt the fiber-drawing process before serious damage, such as the centrifuger exploding, occurs.

Furthermore, it may also occur that the temperatures measured are too low, for example due to the centrifuger being positioned as illustrated in FIG. 3 and which impairs the quality of the fibers produced, which are then drawn from filaments which are too thick. Although modification of the external drawing burner is ruled out, in order to obtain the same fineness of the fibers it is then necessary to adjust the internal heating of the centrifuger operated by the internal burner or by the magnetic inductors and/or to alter temperature of the molten glass.

One particular case is that of a temperature which is far too low at point C, the situation then being such that it is necessary to avoid glass accumulating in the centrifuger owing to devitrication of the glass at the base of the centrifuger, the base being further from the burner lip and thus heated to a lesser extent thereby but which moreover is subject to cooling owing to rotation as a result of the air under the centrifuger being stirred. Preferably, activation of the additional heating means for the base of the centrifuger is made dependent on this temperature at point C, this step being facilitated by the fact that electro-magnetic inductors are used which thus react rapidly. However, the inductors may preferably be controlled, for example by limiting the regulation of the frequencies, since it is known that in practice electro-magnetic heating is powerless to de-glass a centrifuger if, in spite of all precautions taken, the glass has devitrified, and that it is thus useless or even dangerous to continue this heating process. An inductor set at the maximum frequency even if the temperature at the bottom of the strip is too low should thus cause the flow of molten glass to stop immediately.

Obviously, numerous modifications and variations of the present invention are possible in light of the above teachings. It is therefore to be understood that within the scope of the appended claims, the invention may be practiced otherwise than as specifically described herein.

What is claimed is:

1. Process for controlling production of mineral fibers, comprising the steps of:
   drawing fibers through outlet orifices in a peripheral strip of a centrifuger by use of hot gases heated by a burner;
   determining temperatures of said peripheral strip at a vertically spaced plurality of points thereon;
   correlating said determined temperature of each of said points with vertical coordinates of said points to produce a temperature profile; and
   regulating a process parameter in dependence on said temperature profile to thus control said production of said mineral fibers during said process.

2. Process according to claim 1 wherein said determining step comprises vertically scanning said peripheral strip and measuring emitted radiation at said points.

3. Process according to claim 1 including the step of determining which of said points is a hottest point on said peripheral strip.

4. Process according to claim 1 including the step of determining a temperature at a base of said peripheral strip.

5. Process according to claim 1 including the step of determining a temperature at a top of said peripheral strip.

6. Process according to claim 4 including the step of using said temperature at said base of said peripheral strip as a regulating value for an electro-magnetic induction means for heating said base of said peripheral strip.

7. Process according to claim 1 including the step of determining an abnormality in said centrifuger based on said temperature profile.

8. Process according to claim 1 wherein said step of regulating a process parameter in dependence on said temperature profile is performed at a time before or after said drawing step.

* * * * *